(12) United States Patent
Makino et al.

(10) Patent No.: US 12,034,356 B2
(45) Date of Patent: Jul. 9, 2024

(54) MOTOR

(71) Applicant: NIDEC CORPORATION, Kyoto (JP)

(72) Inventors: Yusuke Makino, Kyoto (JP); Riku Konishi, Kyoto (JP); Tatsuki Shigeta, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 406 days.

(21) Appl. No.: 17/311,689

(22) PCT Filed: Nov. 22, 2019

(86) PCT No.: PCT/JP2019/045864
§ 371 (c)(1),
(2) Date: Jun. 8, 2021

(87) PCT Pub. No.: WO2020/137291
PCT Pub. Date: Jul. 2, 2020

(65) Prior Publication Data
US 2022/0029504 A1    Jan. 27, 2022

(30) Foreign Application Priority Data

Dec. 25, 2018 (JP) ................... 2018-241474

(51) Int. Cl.
*H02K 5/26* (2006.01)
*H02K 3/52* (2006.01)
(Continued)

(52) U.S. Cl.
CPC ............... *H02K 5/26* (2013.01); *H02K 3/522* (2013.01); *H02K 5/1732* (2013.01);
(Continued)

(58) Field of Classification Search
CPC ............ H02K 5/225; H02K 5/18; H02K 5/26; H02K 3/522; H02K 11/215; H02K 21/16;
(Continued)

(56) References Cited

U.S. PATENT DOCUMENTS 5,610,462 A * 3/1997 Takahashi ............ H02K 5/1675
310/90
7,368,840 B2 * 5/2008 Terauchi ................ H02K 7/083
310/71

(Continued)

FOREIGN PATENT DOCUMENTS

JP    H9182403 A    7/1997
JP    2001349228 A   12/2001
(Continued)

OTHER PUBLICATIONS

International Search Report in PCT/JP2019/045864, dated Feb. 10, 2020. 4pp.

(Continued)

Primary Examiner — Alex W Mok
(74) Attorney, Agent, or Firm — HAUPTMAN HAM, LLP (57) ABSTRACT

An exemplary embodiment of the present invention provides a motor including: a rotor configured to rotate about a central axis; a stator disposed radially opposite the rotor with a clearance defined between the stator and the rotor; a housing accommodating the rotor and the stator; a bearing supporting the rotor in a rotatable manner; a bearing holder holding the bearing, the bearing holder being fixed to the housing; a rotation sensor configured to detect rotation of the rotor; and a sensor holder disposed in the bearing holder to hold the rotation sensor. According to an exemplary embodiment of the present invention, the motor includes a position adjustment mechanism configured to adjust a circumferential position of the rotation sensor by integrally rotating the bearing holder and the sensor holder relative to the housing in a circumferential direction.

10 Claims, 4 Drawing Sheets

(51) Int. Cl.
*H02K 5/173* (2006.01)
*H02K 11/215* (2016.01)
*H02K 21/16* (2006.01)

(52) U.S. Cl.
CPC ........... *H02K 11/215* (2016.01); *H02K 21/16* (2013.01); *H02K 2203/09* (2013.01)

(58) Field of Classification Search
CPC ........ H02K 3/521; H02K 7/14; H02K 5/1732; H02K 2213/09; H02K 2203/09
USPC .......................................................... 310/71
See application file for complete search history.

(56) References Cited

U.S. PATENT DOCUMENTS

| | | | | |
|---|---|---|---|---|
| 7,453,175 B2 * | 11/2008 | Nakanishi | ................ | H02K 7/20 |
| | | | | 310/68 B |
| 7,508,102 B2 * | 3/2009 | Sugiyama | ............... | H02K 3/522 |
| | | | | 310/90 |
| 7,550,884 B2 * | 6/2009 | Nomura | ................ | H02K 1/187 |
| | | | | 310/90 |
| 7,589,443 B2 * | 9/2009 | Kataoka | ............... | H02K 11/215 |
| | | | | 310/68 B |
| 7,607,520 B2 * | 10/2009 | Matsushita | ............... | H02K 7/06 |
| | | | | 188/162 |
| 7,795,766 B2 * | 9/2010 | Kataoka | ............... | B62D 5/0403 |
| | | | | 310/68 E |
| 9,048,716 B2 * | 6/2015 | Migita | .................... | H02K 11/20 |
| 9,653,960 B2 * | 5/2017 | Matsuda | ................. | H02K 5/15 |
| 9,812,932 B2 * | 11/2017 | Kitaji | ..................... | H02K 29/08 |
| 10,050,483 B2 | 8/2018 | Sambuichi et al. | | |
| 10,084,361 B2 | 9/2018 | Kitaji et al. | | |
| 2006/0226719 A1 * | 10/2006 | Nakanishi | ............... | H02K 29/12 |
| | | | | 310/68 B |
| 2008/0290747 A1 * | 11/2008 | Nomura | ................ | H02K 5/1735 |
| | | | | 310/90 |
| 2009/0039725 A1 * | 2/2009 | Kanatani | ................ | H02K 7/116 |
| | | | | 310/83 |
| 2011/0067945 A1 * | 3/2011 | Sonoda | ................ | B62D 5/0409 |
| | | | | 180/444 |
| 2013/0015748 A1 * | 1/2013 | Takei | .................... | F16C 35/077 |
| | | | | 310/68 B |
| 2014/0132122 A1 * | 5/2014 | Furukawa | ................ | H02K 5/15 |
| | | | | 310/68 B |
| 2015/0008783 A1 * | 1/2015 | Kitaji | ..................... | H02K 3/522 |
| | | | | 310/215 |
| 2015/0162798 A1 * | 6/2015 | Ozawa | ..................... | H02K 5/22 |
| | | | | 310/43 |
| 2015/0222152 A1 * | 8/2015 | Yamada | ................. | H02K 29/08 |
| | | | | 29/598 |
| 2018/0069457 A1 * | 3/2018 | Michishita | ........... | H02K 11/215 |
| 2018/0076696 A1 * | 3/2018 | Mizuike | ................ | H02K 5/1735 |

FOREIGN PATENT DOCUMENTS

| | | |
|---|---|---|
| JP | 200633989 A | 2/2006 |
| JP | 2013110846 A | 6/2013 |
| KR | 100895006 B1 * | 4/2009 |
| WO | 2017002869 A1 | 1/2017 |

OTHER PUBLICATIONS

Lewis et al. "Manual on application technique of household controller" p. 278, Beijing: Machine Industry Press, Jan. 1998. 9pp.

* cited by examiner

MOTOR

CROSS-REFERENCE TO RELATED APPLICATIONS

This is the U.S. national stage of application No. PCT/JP2019/045864, filed on Nov. 22, 2019, and priority under 35 U.S.C. § 119(a) and 35 U.S.C. § 365 (b) is claimed from Japanese Patent Application No. 2018-241474, filed on Dec. 25, 2018.

FIELD OF THE INVENTION

The present invention relates to a motor.

BACKGROUND

A known motor has a structure capable of adjusting a circumferential position of a rotation sensor configured to detect rotation of a rotor. For example, there is known a structure capable of adjusting a circumferential position of a phase detection sensor as a rotation sensor by rotating a board holder disposed in a housing.

In the structure described above, however, the rotating board holder rubs against the housing, so that the housing may scratch a surface of the board holder. This may result in contamination in the housing.

SUMMARY

An exemplary embodiment of the present invention provides a motor including: a rotor configured to rotate about a central axis; a stator disposed radially opposite the rotor with a clearance defined between the stator and the rotor; a housing accommodating the rotor and the stator; a bearing supporting the rotor in a rotatable manner; a bearing holder holding the bearing, the bearing holder being fixed to the housing; a rotation sensor configured to detect rotation of the rotor; and a sensor holder disposed in the bearing holder to hold the rotation sensor. According to an exemplary embodiment of the present invention, the motor includes a position adjustment mechanism configured to adjust a circumferential position of the rotation sensor by integrally rotating the bearing holder and the sensor holder relative to the housing in a circumferential direction.

The above and other elements, features, steps, characteristics and advantages of the present disclosure will become more apparent from the following detailed description of the preferred embodiments with reference to the attached drawings.

DETAILED DESCRIPTION

In the respective drawings, a Z axis illustrated as appropriate extends in a vertical direction, of which a positive side is defined as an "upper side" and a negative side is defined as a "lower side". Also in the respective drawings, a central axis J illustrated as appropriate indicates an imaginary line that is parallel with the Z axis and extends in the vertical direction. In the following description, the term "axial direction", "axial", or "axially" refers to an axial direction of the central axis J, that is, a direction parallel with the vertical direction. The term "radial direction", "radial", or "radially" refers to a radial direction from the central axis J. The term "circumferential direction", "circumferential", or "circumferentially" refers to a circumferential direction about the central axis J.

In the following embodiment, the lower side corresponds to a first side in the axial direction. It should be noted that the definitions, "vertical direction", "upper side", and "lower side" are merely used for explaining arrangement relationships and the like of constituent elements. Actual arrangement relationships and the like may be arrangement relationships and the like other than the arrangement relationships and the like indicated by the definitions.

Figure 1:
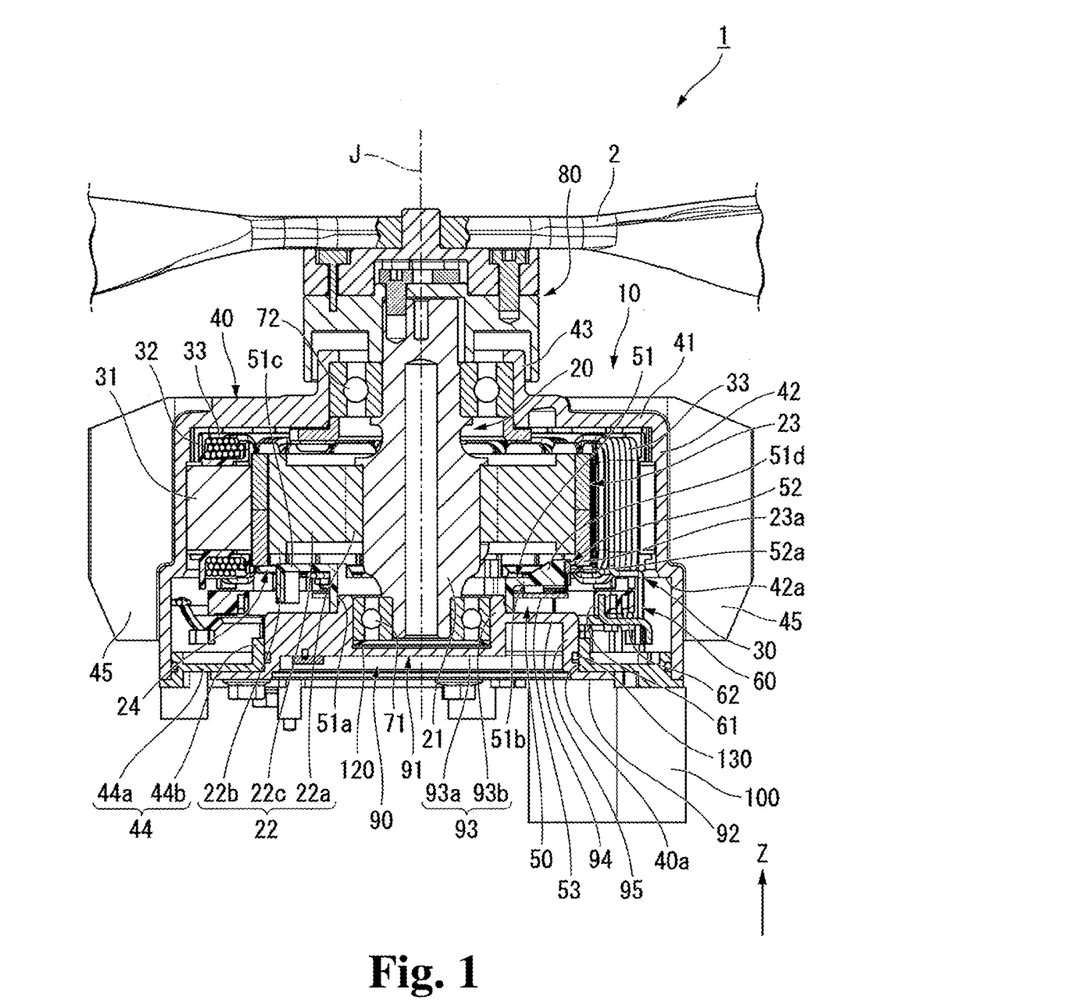
FIG. 1 is a sectional view of a rotor apparatus according to the present embodiment.

As illustrated in FIG. 1, a motor 10 according to the present embodiment is installed in a rotor apparatus 1. The rotor apparatus 1 is mounted on, for example, an unmanned flying object. The rotor apparatus 1 includes the motor 10 and a propeller 2.

The motor 10 includes a rotor 20, a stator 30, a housing 40, a bearing holder 90, a sensor assembly 50, a bus bar assembly 60, a first bearing 71, a second bearing 72, a propeller mount portion 80, and a power source connector 100. The housing 40 accommodates therein the rotor 20, the stator 30, the sensor assembly 50, the bus bar assembly 60, the first bearing 71, and the second bearing 72.

The rotor 20 rotates about the central axis J. The rotor 20 includes a shaft 21 and a rotor main body 24. The shaft 21 is disposed along the central axis J. The shaft 21 has a columnar shape about the central axis J and extends axially. The shaft 21 has an upper end protruding upward of the housing 40. The propeller mount portion 80 is fixed to the upper end of the shaft 21. The propeller mount portion 80 corresponds to a portion where the propeller 2 is mounted. The propeller mount portion 80 is located outside the housing 40.

The rotor main body 24 is fixed to an outer peripheral face of the shaft 21. The rotor main body 24 includes a rotor core 22 and a rotor magnet 23. In other words, the rotor 20 includes the rotor core 22 and the rotor magnet 23. The rotor core 22 is fixed to an outer peripheral face of the shaft 21. The rotor core 22 includes an inner core portion 22a, an outer core portion 22b, and a plurality of connection portions 22c. The inner core portion 22a has a ring shape and extends circumferentially. In the present embodiment, the inner core portion 22a has an annular ring shape about the central axis J. The inner core portion 22a is fixed to the outer peripheral face of the shaft 21. The outer core portion 22b is located radially outside the inner core portion 22a. In the present embodiment, the outer core portion 22b has a ring shape and extends circumferentially. More specifically, the outer core portion 22b has an annular ring shape about the central axis J. The outer core portion 22b protrudes axially upward and downward of the inner core portion 22a.

The connection portions 22c are located between the inner core portion 22a and the outer core portion 22b in the radial direction. The connection portions 22c connect the inner core portion 22a to the outer core portion 22b. The connection portions 22c are arranged circumferentially. The connection portions 22c are equal in axial size to the inner core portion 22a. The connection portions 22c have upper ends disposed at the same position as an upper end of the inner core portion 22a in the axial direction. The connection portions 22c have lower ends disposed at the same position as a lower end of the inner core portion 22a in the axial direction.

The rotor magnet 23 is fixed to a radially outer face of the rotor core 22. In the present embodiment, the rotor magnet 23 is fixed to the radially outer face of the rotor core 22 with an adhesive. The radially outer face of the rotor core 22 corresponds to a radially outer face of the outer core portion 22b. Although not illustrated in the drawings, the rotor 20 includes a plurality of the rotor magnets 23 circumferentially spaced apart from one another. The rotor magnets 23 are equidistantly arranged in the circumferential direction.

The rotor magnets 23 each have a substantially parallelepiped shape and extends axially. The rotor magnets 23 each have chamfered corners. In the present embodiment, each of the rotor magnets 23 includes two magnets that are axially connected to each other. The rotor magnets 23 each have the north pole and the south pole in the radial direction. With regard to circumferentially adjacent two of the rotor magnets 23, the radial positions of the north pole and south pole are inverted. In other words, with regard to circumferentially adjacent two of the rotor magnets 23, the north pole of one rotor magnet 23 is directed radially outward, whereas the south pole of the other rotor magnet 23 is directed radially outward.

The rotor magnets 23 have upper ends disposed at the same position as an upper end of the outer core portion 22b in the axial direction. The rotor magnets 23 have lower ends located below a lower end of the outer core portion 22b. The rotor magnets 23 have portions located below the outer core portion 22b, and the portions correspond to protrusions 23a protruding downward of the rotor core 22. In other words, the rotor magnets 23 include the protrusions 23a protruding downward of the rotor core 22.

The first bearing 71 and the second bearing 72 support the rotor 20 in a rotatable manner. More specifically, the first bearing 71 supports a portion, which is located below the rotor core 22, of the shaft 21 in a rotatable manner. The second bearing 72 supports a portion, which is located above the rotor core 22, of the shaft 21 in a rotatable manner. In the present embodiment, each of the first bearing 71 and the second bearing 72 is a rolling bearing. Each of the first bearing 71 and the second bearing 72 is, for example, a ball bearing.

The stator 30 is disposed radially opposite the rotor 20 with a clearance defined between the stator 30 and the rotor 20. The stator 30 is located radially outside the rotor 20. The stator 30 includes a stator core 31, an insulator 32, and a plurality of coils 33. The coils 33 are mounted to the stator core 31 with the insulator 32 interposed between the coils 33 and the stator core 31.

The housing 40 includes a top wall 41, a tubular portion 42, a holding portion 43, a bottom wall 44, and a plurality of fins 45. In the present embodiment, the top wall 41, the tubular portion 42, the holding portion 43, and the fins 45 form a part of an identical and single member. The bottom wall 44 is a separate member from the single member including the top wall 41, the tubular portion 42, the holding portion 43, and the fins 45, and is fixed to the single member.

The top wall 41 is located above the stator 30 so as to cover the stator 30 from above. The top wall 41 has an annular ring plate shape about the central axis J. The tubular portion 42 extends downward from a radially outer peripheral edge of the top wall 41. The tubular portion 42 has a cylindrical shape about the central axis J, and is opened at its lower side. The tubular portion 42 has an inner peripheral face to which the stator core 31 is fixed. The tubular portion 42 has an outer diameter and an inner diameter larger at its lower portion than those at its axial center. Therefore, the tubular portion 42 has on its inner peripheral face a step portion 42a.

The tubular portion 42 has on its outer peripheral face the plurality of fins 45 arranged circumferentially. The fins 45 are equidistantly arranged in the circumferential direction. The holding portion 43 protrudes upward from a radially inner peripheral edge of the top wall 41. The holding portion 43 holds at its radially inner side the second bearing 72.

The bottom wall 44 is fixed to a lower end of the tubular portion 42. The bottom wall 44 is located below the stator 30 so as to cover the stator 30 from below. The bottom wall 44 includes a bottom wall main body 44a and a first fitting tube portion 44b. The bottom wall main body 44a has an annular ring plate shape about the central axis J. The bottom wall main body 44a has a radially outer peripheral edge fixed to the lower end of the tubular portion 42 with, for example, a screw. The bottom wall main body 44a has a radially inner peripheral edge located radially inside the stator 30. The first fitting tube portion 44b has a cylindrical shape about the central axis J and extends axially. In the present embodiment, the first fitting tube portion 44b extends upward from the radially inner peripheral edge of the bottom wall main body 44a.

The bottom wall 44 is provided with the power source connector 100. The power source connector 100 protrudes downward from the bottom wall main body 44a. The power source connector 100 is connected to an external power source for power supply to the motor 10.

The housing 40 has an opening 40a opened at its lower side. In the present embodiment, the opening 40a is formed in the bottom wall 44. The opening 40a is a through-hole axially penetrating through the center of the bottom wall main body 44a.

Figure 2:
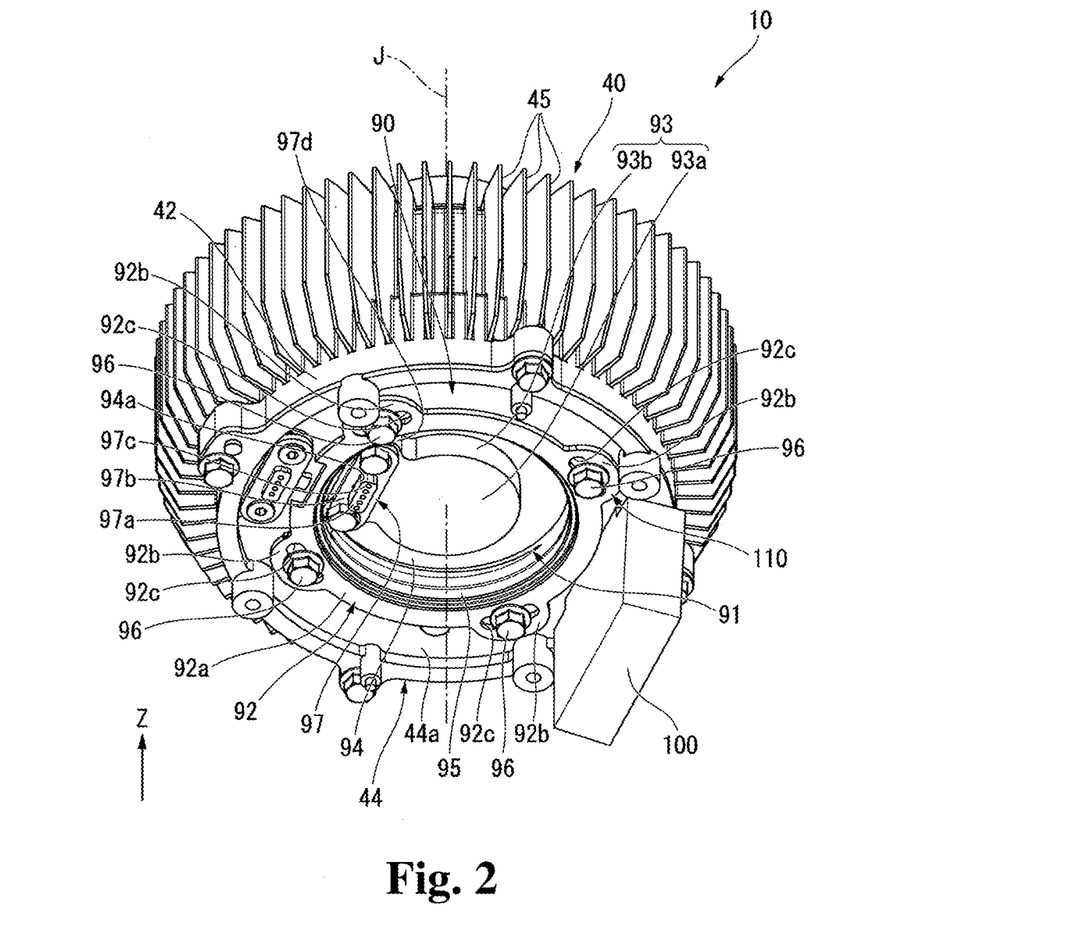
FIG. 2 is a perspective view of a motor according to the present embodiment.

The bearing holder 90 holds the first bearing 71, and is fixed to the housing 40. In the present embodiment, the bearing holder 90 is fixed to the bottom wall 44. In the present embodiment, the bearing holder 90 forms a shell of the motor 10 in conjunction with the housing 40. As illustrated in FIG. 2, the bearing holder 90 is exposed from a lower side of the motor 10. The bearing holder 90 is made of a metal. The bearing holder 90 includes a bearing holder main body 91 and a holder flange 92.

The bearing holder main body 91 is disposed in the opening 40a. The bearing holder main body 91 has a one end-closed cylindrical shape about the central axis J, and is opened at its lower side. In the present embodiment, the bearing holder main body 91 is fitted to the opening 40a to close the opening 40a. The bearing holder main body 91 includes a holding portion 93, an annular ring portion 94, and a second fitting tube portion 95.

Figure 3:
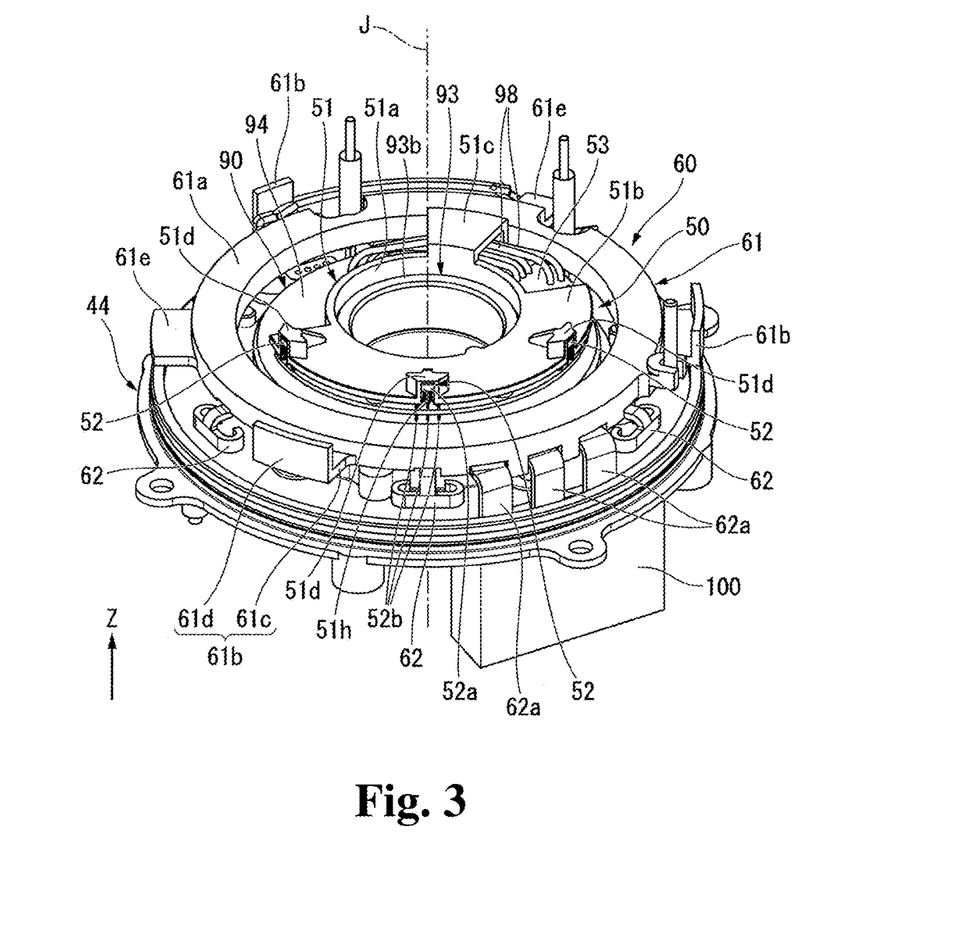
FIG. 3 is a perspective view of a bearing holder, a sensor assembly, a bus bar assembly, and a part of a housing according to the present embodiment.
Figure 4:
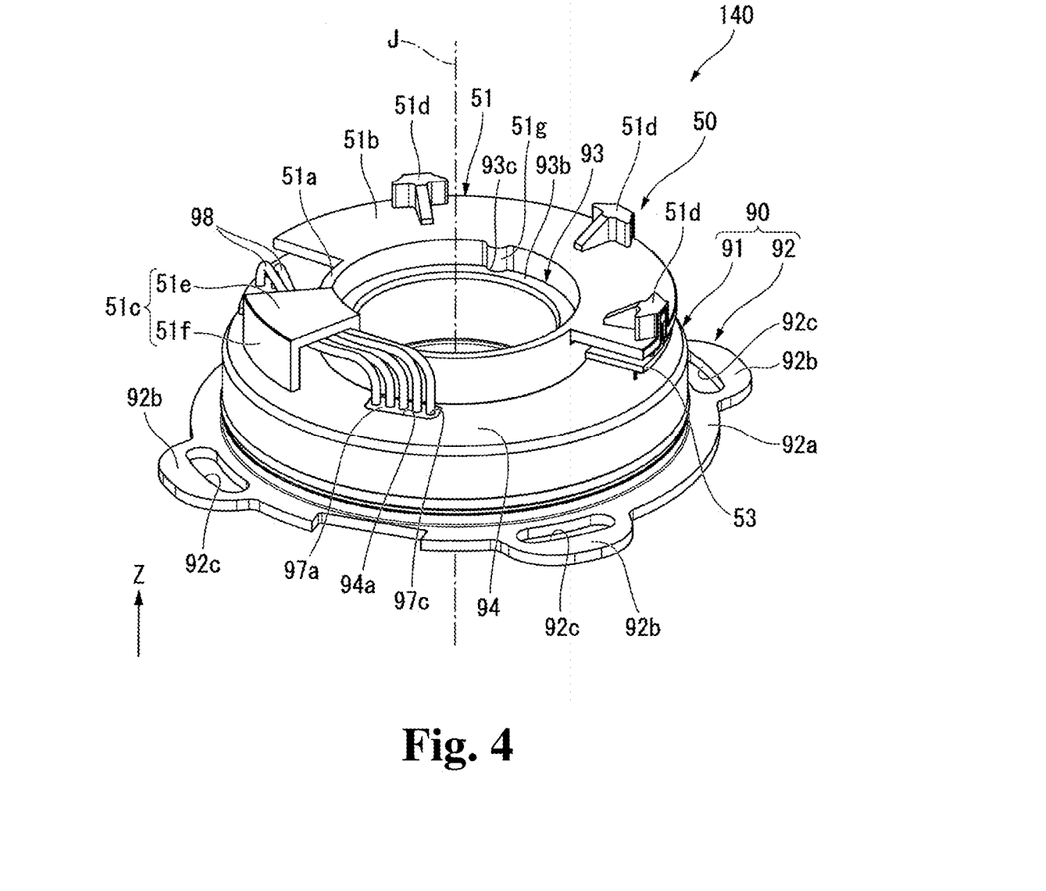
FIG. 4 is a perspective view of the bearing holder and the sensor assembly according to the present embodiment.

As illustrated in FIGS. 3 and 4, the annular ring portion 94 has an annular ring plate shape about the central axis J. As illustrated in FIG. 1, the annular ring portion 94 is located above the bottom wall 44. The annular ring portion 94 is located radially inside the tubular portion 42. As illustrated in FIG. 4, the annular ring portion 94 has a through-hole 94a axially penetrating through the annular ring portion 94. The through-hole 94a extends circumferentially. The through-hole 94a axially penetrates through the bearing holder 90. More specifically, as illustrated in FIG. 2, the through-hole 94a axially penetrates through the annular ring portion 94, a base portion 97d (to be described later), and a fixing member 97b (to be described later).

As illustrated in FIG. 1, the second fitting tube portion 95 extends downward from a radially outer peripheral edge of the annular ring portion 94. The second fitting tube portion 95 has a cylindrical shape about the central axis J and extends axially. The second fitting tube portion 95 is located radially inside the first fitting tube portion 44b. The second fitting tube portion 95 has an upper end located above an upper end of the first fitting tube portion 44b. The second fitting tube portion 95 has a lower end located below the radially inner peripheral edge of the bottom wall main body 44a.

The first fitting tube portion 44b and the second fitting tube portion 95 are fitted together. An O-ring 130 having an annular ring shape about the central axis J is disposed between an inner peripheral face of the first fitting tube portion 44b and an outer peripheral face of the second fitting tube portion 95 in the radial direction. The O-ring 130 is in contact with the inner peripheral face of the first fitting tube portion 44b and the outer peripheral face of the second fitting tube portion 95 to seal a radial interface between the inner peripheral face of the first fitting tube portion 44b and the outer peripheral face of the second fitting tube portion 95.

The holding portion 93 is disposed on a radially inner peripheral edge of the annular ring portion 94. The holding portion 93 includes a tube portion 93b and a bottom portion 93a. The tube portion 93b protrudes axially upward and downward from the radially inner peripheral edge of the annular ring portion 94. The tube portion 93b has a substantially cylindrical shape about the central axis J. The tube portion 93b is opened at its upper side. The tube portion 93b has a lower end located above the lower end of the second fitting tube portion 95. The tube portion 93b holds at its radially inner side the first bearing 71. In the present embodiment, the first bearing 71 is loosely fitted to the radially inner side of the tube portion 93b.

As illustrated in FIG. 4, the tube portion 93b has in its outer peripheral face a recess 93c recessed radially inward. The recess 93c extends axially and is opened upward. The recess 93c has an inner face formed into an arc shape recessed radially inward as seen from the axial direction.

The bottom portion 93a has a substantially disk shape about the central axis J. The bottom portion 93a covers the first bearing 71 and the shaft 21 from below. The bottom portion 93a has a radially outer peripheral edge connected to a lower end of the tube portion 93b. A preload member 120 is provided between the bottom portion 93a and the first bearing 71. The preload member 120 applies an upward load onto an outer race of the first bearing 71. The preload member 120 is, for example, a wave washer.

The holder flange 92 protrudes radially outward from the bearing holder main body 91. In the present embodiment, the holder flange 92 protrudes radially outward from the lower end of the second fitting tube portion 95. The holder flange 92 has a plate shape, and the plate plane thereof is directed axially. The holder flange 92 is in contact with the peripheral edge of the opening 40a from below. In the present embodiment, the peripheral edge of the opening 40a corresponds to a radially inner peripheral edge of a lower face of the bottom wall main body 44a.

As illustrated in FIG. 2, the holder flange 92 has a substantially annular ring shape about the central axis J. The holder flange 92 includes a base 92a and a fixing portion 92b. The base 92a has an annular ring shape about the central axis J. The fixing portion 92b protrudes radially outward from the base 92a. The holder flange 92 includes a plurality of the fixing portions 92b arranged circumferentially. The fixing portions 92b are equidistantly arranged in the circumferential direction. In the present embodiment, the number of fixing portions 92b is, for example, four.

The fixing portions 92b have oblong holes 92c axially penetrating through the fixing portions 92b. The oblong holes 92c extend circumferentially. Screw members 96 pass through the oblong holes 92c to fix the bearing holder 90 to the housing 40. The screw members 96 are passed through the oblong holes 92c from below, and then are tightened to the housing 40. More specifically, the screw members 96 are passed through the oblong holes 92c from below, and then are tightened to female screw holes in the peripheral edge of the opening 40a. The holder flange 92 is thus fixed to the peripheral edge of the opening 40a, so that the bearing holder 90 is fixed to the housing 40. In a state in which the screw members 96 are removed or in a state in which the screw members 96 are loosened, the bearing holder 90 is circumferentially rotatable in a range where portions of the screw members 96 passing through the oblong holes 92c are circumferentially movable in the oblong holes 92c. The screw members 96 have screw heads exposed to the outside of the motor 10.

The bearing holder 90 also includes a sensor connector 97. The sensor connector 97 is capable of outputting a signal output from a rotation sensor 52 to be described later. Although not illustrated in the drawings, the sensor connector 97 is connected to a connector of a control device configured to output a signal of the rotation sensor 52. The sensor connector 97 includes the base portion 97d, a bushing 97a, and the fixing member 97b. The base portion 97d protrudes downward from the annular ring portion 94. The base portion 97d is located radially outside the tube portion 93b, and is connected to the tube portion 93b.

The bushing 97a is fitted to the through-hole 94a. The bushing 97a has a lower end protruding downward of the base portion 97d. The bushing 97a has a lower end to which the connector of the control device connected to the sensor connector 97 is connected. As illustrated in FIG. 4, the bushing 97a has an upper end located at the same axial position as an upper face of the annular ring portion 94. The bushing 97a has a plurality of connection holes 97c axially passing through the bushing 97a.

As illustrated in FIG. 2, the fixing member 97b is fixed to the base portion 97d with a screw to fix the bushing 97a to the base portion 97d. Although not illustrated in the drawings, the fixing member 97b presses a flange protruding from an outer peripheral face of the bushing 97a, against the base portion 97d from below to fix the bushing 97a to the base portion 97d.

As illustrated in FIG. 1, the sensor assembly 50 is located between the rotor core 22 and the bearing holder 90 in the axial direction. The sensor assembly 50 includes a sensor holder 51, the rotation sensor 52, and a circuit board 53. In other words, the motor 10 includes the sensor holder 51, the rotation sensor 52, and the circuit board 53.

The sensor holder 51 is disposed in the bearing holder 90 to hold the rotation sensor 52. In the present embodiment, the bearing holder 90 and the sensor holder 51 are separate members. The sensor holder 51 is made of a resin. As illustrated in FIGS. 3 and 4, the sensor holder 51 includes a fixed tube portion 51a, a flange 51b, a wire holding portion 51c, and a sensor holding portion 51d.

The fixed tube portion 51a is disposed around the central axis J and is fixed to the bearing holder 90. The fixed tube portion 51a has a cylindrical shape about the central axis J, and is opened at its axially opposite sides. The fixed tube portion 51a is fitted to the tube portion 93b from radially outward of the tube portion 93b. The fixed tube portion 51a has an inner peripheral face fixed to the outer peripheral face of the tube portion 93b with, for example, an adhesive. The sensor holder 51 is thus fixed to the bearing holder 90. For example, a groove for adhesion, which is filled with an adhesive, is formed in at least one of the inner peripheral face of the fixed tube portion 51a and the outer peripheral face of the tube portion 93b. The fixed tube portion 51a has a lower end that is in contact with the upper face of the annular ring portion 94. The fixed tube portion 51a has an upper end located above the tube portion 93b.

As illustrated in FIG. 4, the fixed tube portion 51a has on its inner peripheral face a projection 51g protruding radially inward. The projection 51g extends axially. The projection 51g has an arc contour protruding radially inward as seen from the axial direction. The projection 51g is fitted to the recess 93c. The projection 51g is thus circumferentially hung on the recess 93c to inhibit circumferential rotation of the sensor holder 51 relative to the bearing holder 90. In the present embodiment, a portion, which is located radially outside the tube portion 93b, of the projection 51g is fitted to the recess 93c.

The flange 51b protrudes radially outward from the upper end of the fixed tube portion 51a. The flange 51b has a plate shape, and the plate plane thereof is directed axially. The flange 51b extends circumferentially. In the present embodiment, the flange 51b has a substantially semi-arc shape about the central axis J as seen from the axial direction. The flange 51b has a radially outer peripheral edge located radially inside the radially outer peripheral edge of the annular ring portion 94.

The wire holding portion 51c holds a plurality of wires 98 to be described later. This configuration therefore inhibits contact of the wires 98 with the rotor 20 owing to the movement of the wires 98. The wire holding portion 51c is located between the through-hole 94a and a circumferentially first end of the circuit board 53 in the circumferential direction as seen from the axial direction. The wire holding portion 51c includes an upper plate portion 51e and an outer plate portion 51f. In the present embodiment, the upper plate portion 51e corresponds to a first portion, and the outer plate portion 51f corresponds to a second portion.

The upper plate portion 51e protrudes radially outward from the fixed tube portion 51a. More specifically, the upper plate portion 51e protrudes radially outward from a portion, on which the flange 51b is not provided, of the upper end of the fixed tube portion 51a. The upper plate portion 51e is located between the rotor main body 24 and the wires 98 in the axial direction. This configuration therefore allows the upper plate portion 51e to inhibit upward movement of the wires 98. This configuration thus inhibits contact of the wires 98 with the rotor main body 24. The upper plate portion 51e has a radially outer end located radially inside the radially outer peripheral edge of the annular ring portion 94.

The outer plate portion 51f extends downward from the upper plate portion 51e. More specifically, the outer plate portion 51f extends downward from the radially outer end of the upper plate portion 51e. The outer plate portion 51f is located radially outside the wires 98. This configuration therefore allows the outer plate portion 51f to inhibit radially outward movement of the wires 98. This configuration thus inhibits upward movement of the wires 98 owing to radially outward misalignment of the wires 98 relative to the upper plate portion 51e. This configuration accordingly inhibits contact of the wires 98 with the rotor main body 24. The outer plate portion 51f has a lower end located above and apart from the annular ring portion 94.

The sensor holding portion 51d protrudes upward from the radially outer peripheral edge of the flange 51b. As illustrated in FIG. 3, the sensor holding portion 51d has a holding recess 51h holding the rotation sensor 52. The holding recess 51h is opened downward and radially outward. In the present embodiment, the sensor holder 51 includes a plurality of the sensor holding portions 51d arranged circumferentially. The number of sensor holding portions 51d is, for example, three. The three sensor holding portions 51d are equidistantly arranged in the circumferential direction. As illustrated in FIG. 1, the sensor holding portions 51d are located radially inside the protrusions 23a of the rotor magnets 23.

The sensor holder 51 is at least partially located radially inside the stator 30. Therefore, the sensor holder 51 at least partially overlaps the stator 30 as seen from the radial direction. This configuration thus enables reduction in axial size of the motor 10. In the present embodiment, the upper end of the fixed tube portion 51a, the flange 51b, the upper portion of the wire holding portion 51c, and the sensor holding portions 51d in the sensor holder 51 are located radially inside the insulator 32 of the stator 30.

In the present embodiment, the rotation sensor 52 is a magnetic sensor configured to detect a magnetic field of a rotor magnet 23. The rotation sensor 52 is, for example, a Hall element such as a Hall IC. The rotation sensor 52 detects the magnetic field of the rotor magnet 23 to detect rotation of the rotor 20. As illustrated in FIG. 3, the sensor assembly 50 includes a plurality of the rotation sensors 52 arranged circumferentially. The number of rotation sensors 52 is, for example, three. The three rotation sensors 52 are respectively held by the three sensor holding portions 51d.

The rotation sensors 52 each include a sensor main body 52a and a plurality of sensor terminals 52b. The sensor main bodies 52a are fitted to and held by the holding recesses 51h in the sensor holding portions 51d. The sensor holder 51 thus stably holds the rotation sensors 52. In the present embodiment, the sensor main bodies 52a are lightly press fitted to the holding recesses 51h.

As illustrated in FIG. 1, the sensor main bodies 52a are located radially inside the protrusions 23a. In other words, the rotation sensors 52 are located radially inside the protrusions 23a. This configuration therefore causes the rotation sensors 52 to favorably detect magnetic fields of the rotor magnets 23 each having the north pole and the south pole in the radial direction. This configuration thus causes the rotation sensors 52 to accurately detect rotation of the rotor 20. In addition, this configuration eliminates a necessity to separately provide a magnet for detection at the rotation sensor 52 in addition to the rotor magnets 23. This configuration therefore enables reduction in parts count of the motor 10. The rotation sensors 52 are disposed opposite lower ends of radially inner faces of the protrusions 23a with a radial clearance defined between the rotation sensors 52 and the protrusions 23a.

As illustrated in FIG. 3, the sensor terminals 52b extend downward from the sensor main bodies 52a. The sensor terminals 52b are electrically connected to the circuit board 53 through holes in the circuit board 53. The circuit board 53 is fixed to the sensor holder 51. The circuit board 53 has a plate shape, and the plate plane thereof is directed axially. The circuit board 53 is located below the flange 51b. The circuit board 53 has an arc shape and extends circumferentially.

As illustrated in FIG. 4, the circumferentially first end of the circuit board 53 is connected to first ends of the wires 98. The wires 98 are electrically connected to the rotation sensors 52 via the circuit board 53. The wires 98 transmit signals output from the rotation sensors 52. The wires 98 have second ends inserted in the connection holes 97c in the bushing 97a and connected to the sensor connector 97. The connector of the control device (not illustrated) connected to the sensor connector 97 is electrically connected to the wires 98. The sensor connector 97 thus outputs the signal from the rotation sensors 52 to the control device via the sensor terminals 52b, the circuit board 53, and the wires 98.

As illustrated in FIG. 1, the bus bar assembly 60 is located below the stator 30. The bus bar assembly 60 is located radially outside the sensor assembly 50. The bus bar assembly 60 includes a bus bar holder 61 and a bus bar 62. In other words, the motor 10 includes the bus bar holder 61 and the bus bar 62.

The bus bar holder 61 extends circumferentially and holds the bus bar 62. The upper portion of the first bearing 71 and the upper portion of the tube portion 93b are located radially inside the bus bar holder 61. In the present embodiment, the first bearing 71 is at least partially located radially inside the bus bar holder 61. Therefore, the first bearing 71 at least partially overlaps the bus bar holder 61 as seen from the radial direction. This configuration thus enables reduction in axial size of the motor 10.

As illustrated in FIG. 3, in the present embodiment, the bus bar holder 61 has an annular ring shape about the central axis J. The bus bar holder 61 includes a bus bar holder main body 61a, a first positioning portion 61b, and a second positioning portion 61e. The bus bar holder main body 61a has a substantially annular ring shape about the central axis J. The bus bar holder main body 61a is located radially outside the sensor assembly 50 to surround the sensor assembly 50. The bus bar 62 is partially embedded in and is held by the bus bar holder main body 61a.

The first positioning portion 61b includes a radially extending portion 61c and an axially extending portion 61d. The radially extending portion 61c protrudes radially outward from the bus bar holder main body 61a. The axially extending portion 61d protrudes upward from a radially outer end of the radially extending portion 61c. The axially extending portion 61d has an upper end located above the bus bar holder main body 61a. Although not illustrated in the drawings, the upper end of the axially extending portion 61d is in contact with the step portion 42a on the inner peripheral face of the tubular portion 42 from below. The bus bar assembly 60 is thus axially positioned with respect to the housing 40.

The bus bar holder 61 includes a plurality of the first positioning portions 61b arranged circumferentially. The number of first positioning portions 61b is, for example, three. The three first positioning portions 61b are equidistantly arranged in the circumferential direction. The bus bar assembly 60 is thus axially positioned in a stable manner.

The second positioning portion 61e protrudes radially outward from the bus bar holder main body 61a. The second positioning portion 61e has a radially outer end disposed at the same position as a radially outer face of the axially extending portion 61d in the radial direction. The bus bar holder 61 includes a plurality of the second positioning portions 61e arranged circumferentially. The number of second positioning portions 61e is, for example, two. Although not illustrated in the drawings, the radially outer faces of the axially extending portions 61d in the first positioning portions 61b and the radially outer ends of the second positioning portions 61e are in contact with the inner peripheral face of the tubular portion 42. The bus bar holder 61 is thus fitted to the tubular portion 42, so that the bus bar assembly 60 is radially positioned.

The bus bar 62 is electrically connected to the stator 30. More specifically, the bus bar 62 is electrically connected to the coils 33. The bus bar assembly 60 includes a plurality of the bus bars 62. The bus bars 62 each include a terminal 62a having a first end provided at the power source connector 100. The external power source connected to the power source connector 100 is electrically connected to the terminals 62a. The external power source thus supplies electric power to the coils 33 of the stator 30 via the bus bars 62.

As illustrated in FIG. 2, the motor 10 includes a position adjustment mechanism 110. The position adjustment mechanism 110 is a mechanism capable of adjusting a circumferential position of the rotation sensors 52 by integrally rotating the bearing holder 90 and the sensor holder 51 relative to the housing 40 in the circumferential direction. The sensor holder 51 in the bearing holder 90 therefore circumferentially rotates without rubbing against the bearing holder 90. This configuration therefore enables adjustment to the circumferential position of the rotation sensors 52 while inhibiting rubbing of the sensor holder 51 holding the rotation sensors 52. This configuration accordingly inhibits scratching on the surface of the sensor holder 51, and inhibits contamination in the housing 40.

Since the circumferential position of the rotation sensors 52 is adjusted relative to the stator 30, phase matching is achieved between a motor-induced voltage and a signal output from each rotation sensor 52. Phase switching of current to be supplied to the stator 30, that is, commutation is thus made at appropriate timing. This configuration thus enables improvement in efficiency of the motor 10.

In the present embodiment, as illustrated in FIG. 4, an assembly 140 including the bearing holder 90 and the sensor assembly 50 fixed together entirely rotates for positional adjustment to the rotation sensors 52. When the bearing holder 90 rotates, for example, the outer race of the first bearing 71 held by the bearing holder 90 also rotates.

In the present embodiment, the position adjustment mechanism 110 includes the oblong holes 92c bored in the holder flange 92, and the screw members 96 tightened to the housing 40 through the oblong holes 92c. Therefore, as described above, in the state in which the screw members 96 are removed or in the state in which the screw members 96 are loosened, the bearing holder 90 is circumferentially rotatable in the range where the portions of the screw members 96, passing through the oblong holes 92c are circumferentially movable in the oblong holes 92c. This configuration thus enables rotation of the sensor holder 51 together with the bearing holder 90, and enables adjustment to the circumferential position of the rotation sensors 52. After the adjustment to the circumferential position of the rotation sensors 52, the screw members 96 are tightened to the housing 40 to fix the circumferential positions of the bearing holder 90 and sensor holder 51. The circumferential positions of the bearing holder 90 and sensor holder 51 are thus fixed after the adjustment to the circumferential position of the rotation sensors 52.

According to the present embodiment, as described above, the bearing holder 90 and the housing 40 form the shell of the motor 10. In addition, the screw heads of the screw members 96 for fixing the bearing holder 90 to the housing 40 are exposed to the outside of the motor 10. Therefore, the screw members 96 are easily removed or loosened even after the assembly of the motor 10. This configuration thus facilitates the adjustment to the circumferential position of the rotation sensors 52.

The definition "the position adjustment mechanism is capable of adjusting the circumferential position of the rotation sensors" as used herein may involve a position adjustment mechanism capable of adjusting the circumferential position of the rotation sensors at least in assembling the motor. In other words, the position adjustment mechanism may be a mechanism incapable of adjusting the circumferential position of the rotation sensors after the assembly of the motor. The position adjustment mechanism 110 according to the present embodiment is capable of adjusting the circumferential position of the rotation sensors 52 even after the assembly of the motor 10 as described above.

In the present embodiment, the position adjustment mechanism 110 includes the first fitting tube portion 44b of the housing 40 and the second fitting tube portion 95 of the bearing holder 90. Therefore, the bearing holder 90 rotates circumferentially in such a manner that the bearing holder 90 and the housing 40 are aligned coaxially with the central axis J. This configuration therefore enables accurate rotation of the sensor holder 51 and rotation sensors 52 about the central axis J. This configuration thus enables accurate adjustment to the circumferential position of the rotation sensors 52.

According to the present embodiment, the bearing holder 90 includes the sensor connector 97 capable of outputting the signals received from the rotation sensors 52. The sensor connector 97 therefore rotates circumferentially in conjunction with the bearing holder 90 in adjusting the circumferential position of the rotation sensors 52 by circumferentially rotating the bearing holder 90 and the sensor holder 51. The wires 98 connecting the rotation sensors 52 to the sensor connector 97 via the circuit board 53 also rotate circumferentially in conjunction with the rotation sensors 52. This configuration thus inhibits the application of load to the wires 98 in adjusting the circumferential position of the rotation sensors 52.

According to the present embodiment, the bearing holder 90 and the sensor holder 51 are separate members. Therefore, the bearing holder 90 may be made of a metal, and the sensor holder 51 may be made of a resin. Since the bearing holder 90 fixed to the housing 40 is made of a metal, the bearing holder 90 causes less contamination even when the bearing holder 90 rubs against the housing 40 in rotating the bearing holder 90 relative to the housing 40. In addition, since the sensor holder 51 is made of a resin, the rotation sensors 52 are maintained at an isolated state.

The present invention is not limited to the foregoing embodiment, but can adopt other configurations. The position adjustment mechanism is not particularly limited as long as it is a mechanism capable of adjusting a circumferential position of the rotation sensors by integrally rotating the bearing holder and the sensor holder relative to the housing in the circumferential direction. The position adjustment mechanism may include, for example, a crimp portion to be provided in the bearing holder, in place of the screw members. In this case, after the adjustment to the circumferential position of the rotation sensors, the bearing holder is partially crimped to form a crimp portion, so that the bearing holder is fixed to the housing.

The rotation sensors are not particularly limited as long as they are capable of detecting rotation of the rotor. The rotation sensors may be a magnetic sensor such as a magnetoresistance element or may be an optical sensor or the like other than a magnetic sensor. In a case where each rotation sensor is a magnetic sensor, the rotation sensor may detect rotation of the rotor by detecting a magnetic field of a sensor magnet provided in addition to the rotor magnet.

The sensor holder is not particularly limited as long as it is disposed in the bearing holder to hold the rotation sensor. The bearing holder and the sensor holder may form portions of an identical and single member. For example, the bearing holder and the sensor holder may be formed by integral molding using a resin. The sensor connector is not necessarily provided on the bearing holder. In this case, the sensor connector may be provided on the housing. The bearing holder does not necessarily form the shell of the motor. For example, the bearing holder may be accommodated in the housing.

The motor according to the foregoing embodiment may be used for any purpose. The motor according to the foregoing embodiment may be installed in, for example, a vehicle and the like. It should be noted that the respective configurations described herein may be appropriately combined insofar as there are no inconsistencies.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor configured to rotate about a central axis;
   a stator disposed radially opposite the rotor with a clearance defined between the stator and the rotor;
   a housing accommodating the rotor and the stator;
   a bearing supporting the rotor in a rotatable manner;
   a bearing holder holding the bearing,
   the bearing holder being fixed to the housing;
   a rotation sensor configured to detect rotation of the rotor;
   a sensor holder disposed in the bearing holder to hold the rotation sensor, wherein the sensor holder includes a wire holding portion holding a wire electrically connected to the rotation sensor; and
   a position adjustment mechanism configured to adjust a circumferential position of the rotation sensor by integrally rotating the bearing holder and the sensor holder relative to the housing in a circumferential direction, wherein
   the rotor includes:
      a shaft disposed along the central axis; and
      a rotor main body fixed to an outer peripheral face of the shaft,
   the sensor holder includes a fixed tube portion surrounding the central axis and fixed to the bearing holder,
   the wire holding portion includes a first portion protruding radially outward from the fixed tube portion, and
   the first portion is located between the rotor main body and the wire in an axial direction.

2. The motor according to claim 1, wherein
   the housing has an opening opened at a first side in an axial direction,
   the bearing holder includes:
      a bearing holder main body disposed in the opening; and
      a holder flange protruding radially outward from the bearing holder main body,
      the holder flange being fixed to a peripheral edge of the opening, and the position adjustment mechanism includes:
   an oblong hole bored in the holder flange, the oblong hole extending circumferentially; and
   a screw member tightened to the housing through the oblong hole to fix the bearing holder to the housing.

3. The motor according to claim 1, wherein the position adjustment mechanism includes:
   a first fitting tube portion having a cylindrical shape about the central axis and extending axially, the first fitting tube portion being disposed in the housing; and
   a second fitting tube portion having a cylindrical shape about the central axis and extending axially, the second fitting tube portion being disposed in the bearing holder, and
the first fitting tube portion and the second fitting tube portion are fitted together.

4. The motor according to claim 1, wherein the bearing holder includes a sensor connector configured to output a signal received from the rotation sensor.

5. The motor according to claim 1, wherein the rotor includes:
   a rotor core; and
   a rotor magnet fixed to the rotor core, and
the rotation sensor is a magnetic sensor configured to detect rotation of the rotor by detecting a magnetic field of the rotor magnet.

6. The motor according to claim 5, wherein
the rotor magnet includes a protrusion protruding toward a first side in an axial direction with respect to the rotor core, and
the rotation sensor is located radially inside the protrusion.

7. The motor according to claim 1, wherein
the sensor holder is at least partially located radially inside the stator.

8. The motor according to claim 1, further comprising
a bus bar electrically connected to the stator; and
a bus bar holder extending circumferentially and holding the bus bar,
wherein
the bearing is at least partially located radially inside the bus bar holder.

9. The motor according to claim 1, wherein
the bearing holder and the sensor holder are separate members,
the bearing holder is made of a metal, and
the sensor holder is made of a resin and is fixed to the bearing holder.

10. The motor according to claim 1, wherein
the wire holding portion includes a second portion extending from the first portion toward a first side in the axial direction, and
the second portion is located radially outside the wire.

* * * * *